June 11, 1946.  S. LE FIELL  2,401,942

CARCASS HOIST AND LANDING DEVICE

Filed Aug. 17, 1945  2 Sheets-Sheet 1

INVENTOR.
Sidney Le Fiell
BY
Att'y

June 11, 1946.    S. LE FIELL    2,401,942
CARCASS HOIST AND LANDING DEVICE
Filed Aug. 17, 1945    2 Sheets-Sheet 2
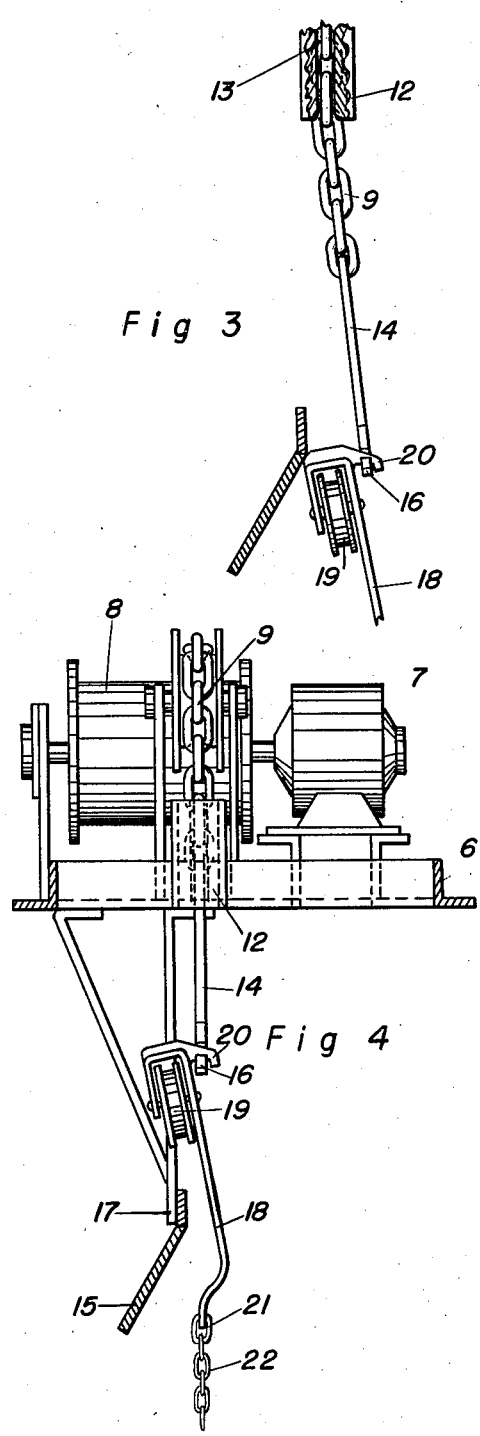
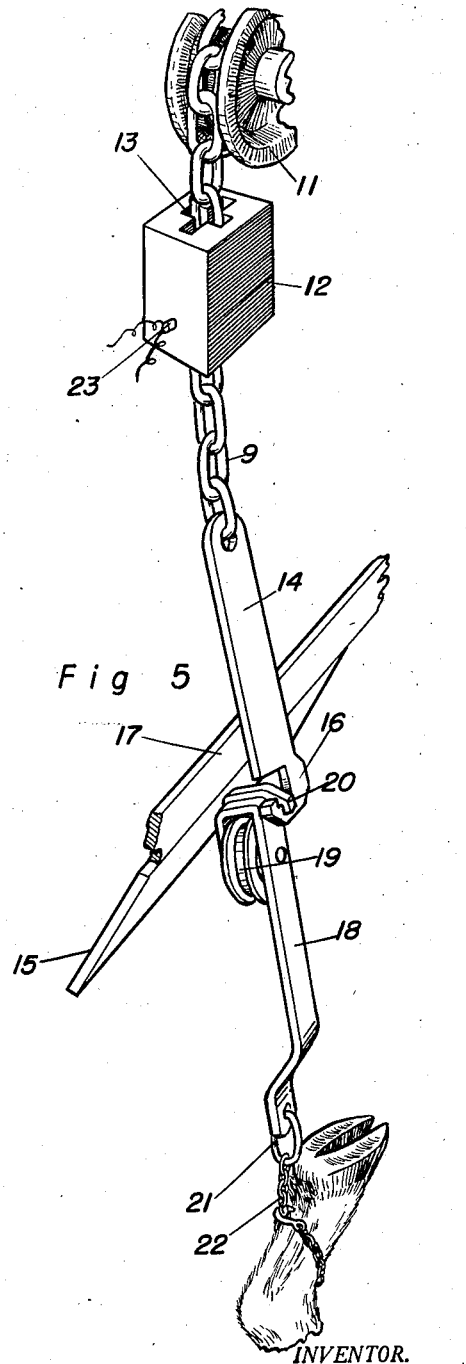
INVENTOR.
Sidney Le Fiell
BY
Att'y Patented June 11, 1946

2,401,942

UNITED STATES PATENT OFFICE 2,401,942

CARCASS HOIST AND LANDING DEVICE

Sidney Le Fiell, San Francisco, Calif.

Application August 17, 1945, Serial No. 611,127

2 Claims. (Cl. 214—95)

This invention relates to improvements in carcass hoisting and landing devices and has particular reference to a device for lifting the carcass of a beef or other animal from the floor to an elevated track and landing it thereon.

The principal object of this invention is to provide means whereby a track engaging wheel attached to the hoisting mechanism will always line up with an overhead track from which the carcass is to be suspended.

A further object is to provide means whereby the swaying of the carcass will not interfere with the hoisting or the landing operation.

A further object is to provide a device of this character which may be installed in any plant without interfering with its presently installed equipment and without involving a large expenditure.

A further object is to provide a structure which is economical to manufacture and simple to install.

Other objects and advantages will be apparent during the course of the following description.

In the accompanying drawings forming a part of this specification and in which like numerals are employed to designate like parts throughout the same, Fig. 1 is a top plan view of my hoisting mechanism.

Fig. 3 is a cross sectional view taken on the line 3—3 of Fig. 2.

Fig. 4 is a cross sectional view taken on the line 4—4 of Fig. 1, and

Fig. 5 is an enlarged fragmentary perspective view of the chain guide and associated parts.

Figure 1:
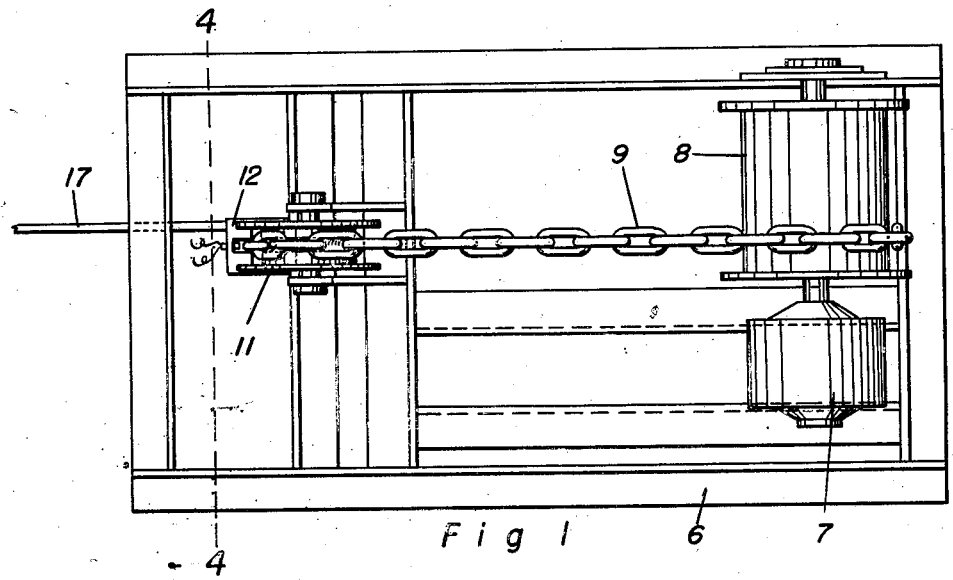
Figure 2:
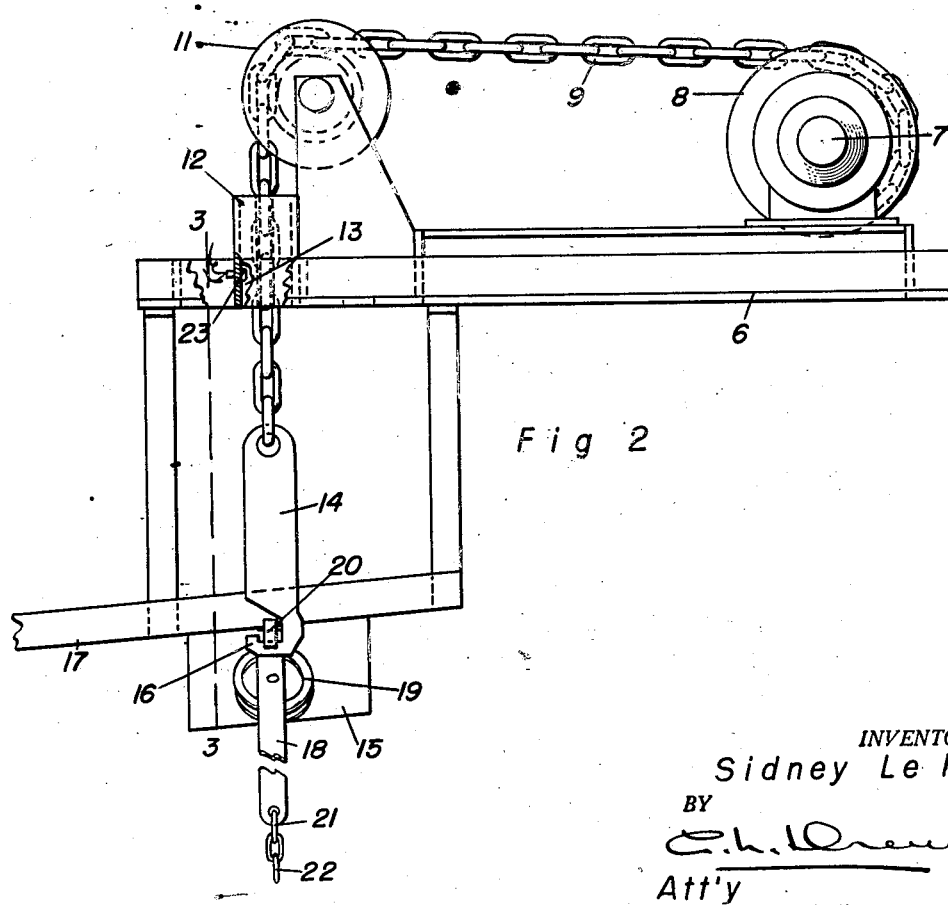
Fig. 2 is a side elevation of Fig. 1.

In the slaughtering of live stock it is customary to drive the animals to be butchered through a chute and to strike them upon the back of the head or neck with a sledge which stuns the animal into unconsciousness. During this time of unconsciousness a chain is hooked around the leg of the animal and it is then raised upwardly from the floor upon which it has been lying.

In this raising or hoisting operation a wheel is attached by a chain to the animal's leg and it then becomes necessary to land this wheel upon the overhead track, which track may be as much as twenty feet from the floor and, therefore, difficult to observe.

It is also necessary that the wheel be properly positioned on the track so that the animal may be moved to the bleeding area.

It is for the purpose of providing means for raising and landing the wheel upon the track that I have devised my invention. It consists of a power hoisting mechanism with a chain extending therefrom and having a bar and hook which can be engaged with a hook-shaped lug extending from the side of the trolley.

This trolley consists of a bent bar with a wheel attached to one end and having a chain at its other end, the chain in turn being hooked around the leg of the animal to be hoisted.

In the accompanying drawings wherein for the purpose of illustration is shown a preferred embodiment of my invention, the numeral 6 designates a frame upon which is mounted the hoisting mechanism, consisting of a motor 7 capable of rotating a drum 8 which has one end of a chain 9 secured thereto.

This chain in turn passes over a sheave 11 and then passes downwardly through a guide block 12, which guide block has an opening 13 therethrough.

It is to be here noted that the shape of this opening 13 is in the shape of a cross which permits the chain 9 to pass through but at the same time prevents the links of the chain from twisting. Secured to the free end of the chain is a bar 14 which has a hook 16 formed at its lower end.

Positioned beneath the frame 6 and suspended therefrom is a track 17, which track is slightly offset to one side from a vertical line passing downwardly through the center of the guide block 12, the purpose of which will be later seen.

A striker plate is shown at 15, which striker plate is mounted beneath the track 17 and is inclined with respect thereto so as to form a cam surface against which the trolley 18 may strike in its upward travel, this cam surface thus guiding the trolley and its wheel past the track.

This trolley 18 consists of a bent bar having a track-engaging wheel 19 at one end and a leg-securing chain 22 as well as a connecting ring 21 at the opposite end.

An offset hook-shaped lug 20 is also formed on one side of the trolley and is adapted to be engaged by the hook 16 carried on the lower end of the bar 14.

A limit switch 23 is positioned in the side of the guide block 12, extending into the opening 13 and adapted to be contacted by the bar 14, as will be later shown.

The result of this construction is that when a carcass is lying on the floor the chain 9 and its bar 14 are lowered until the hooked end 16 may be engaged with the offset lug 20 of the trolley 18.

The motor 7 is now energized so as to rotate the drum 8 and wind in the chain 9, resulting in the carcass being moved from its position on the floor to a vertical position. In so doing the carcass will develop considerable swing and it is, therefore, imperative that some method be employed for lining up the wheel of the trolley with the track upon which the carcass is to be suspended even though there is a swinging and twisting movement.

With my invention it will be apparent that the upper end of the trolley 18 will engage the striker plate 15 and be moved slightly sidewise, as shown in Fig. 5, and thus the wheel of the trolley will pass around the track 17.

Directly thereafter the wheel will arrive at the position shown in Fig. 4 and will then be suspended directly above the track. Also, the end of the bar 14 will now have entered the bottom of the opening 13, and being wider than the links of the chain, will engage the limit switch, thus stopping the motor 7.

It is to be here noted that the shape of the slot has lined up the links of the chain so that the end of the bar is guided into the opening 13 and also that the slots are wider than the links of the chain, so that the links will not engage the limit switch.

It will also be apparent that the bar 14 will hold the wheel 19 rigidly in position directly above the track for the reason that the bar 14 is relatively non-flexible and any sway or swing of the carcass will be lessened to the extent that it cannot move the wheel out of alignment with the track 17.

By now lowering the chain 9 and attached parts the wheel 19 will come to rest on the track 17, and the hook 16 may now be released from the hooked lug 20 of the trolley and the carcass rolled along the track to the bleeding area.

It will thus be seen that I can quickly raise and lower a carcass onto the track with the assurance that at each elevation and each lowering operation the wheel of the trolley will come to rest upon the rail without any manual guiding by the operator.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, the combination with an overhead track and a hoisting mechanism having a hoisting chain positioned above said track, of a guide-block positioned above said track and having an opening formed therethrough to slidably receive said chain, said opening being cross-shaped, whereby the links of said chain are prevented from twisting with relation to each other, and a trolley-engaging hooked bar secured to said chain and adapted to engage a carcass-engaging trolley and to move said trolley to a point above said track, said chain and said bar passing through and into said opening in said guide-block positively positioning the trolley above said track.

2. In a carcass hoisting mechanism, the combination with an overhead track and an inclined striker-plate secured thereto, of a hoisting chain and a guide-block positioned thereabove and offset with respect to said track, said chain passing through said guide-block, means provided in said guide-block for preventing the links of said chain from twisting with respect to each other, and a bar connected to said chain and capable of being moved into said block, the free end of said bar engaging a wheel-trolley connected to the carcass whereby when the end of said bar is positioned in said guide-block, said wheel of said trolley will overlie said track, and a limit switch positioned in said guide-block and adapted to be engaged by said bar to limit the upward movement of said chain and said bar.

SIDNEY LE FIELL.